Sept. 7, 1948.  C. E. FAXON  2,448,786
CONFECTIONARY FORMING MECHANISM
Filed June 8, 1946.  4 Sheets-Sheet 1
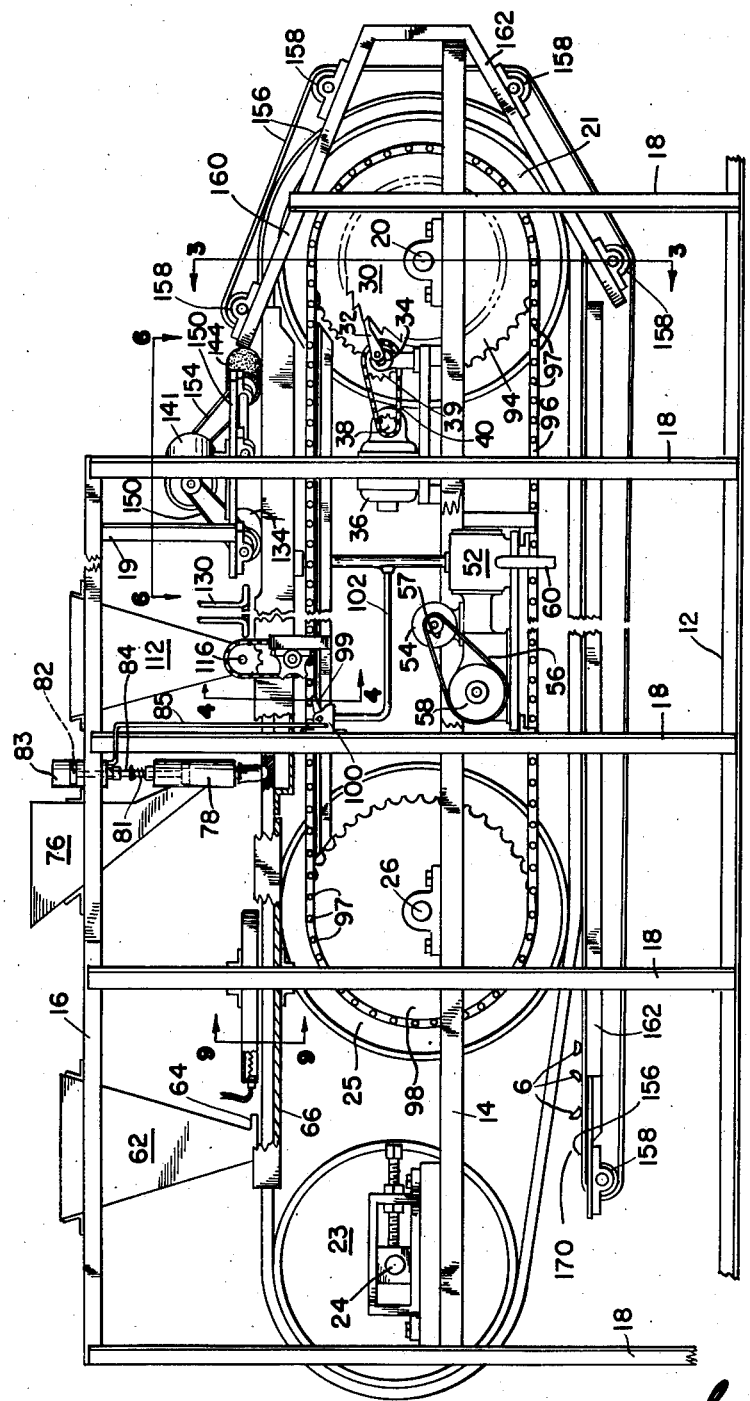
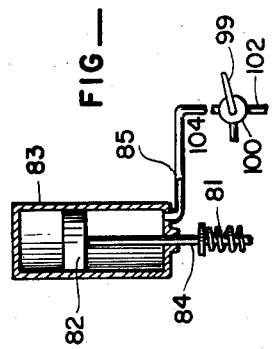
Inventor
CHARLES E. FAXON
By Smith + Tuck
Attorneys

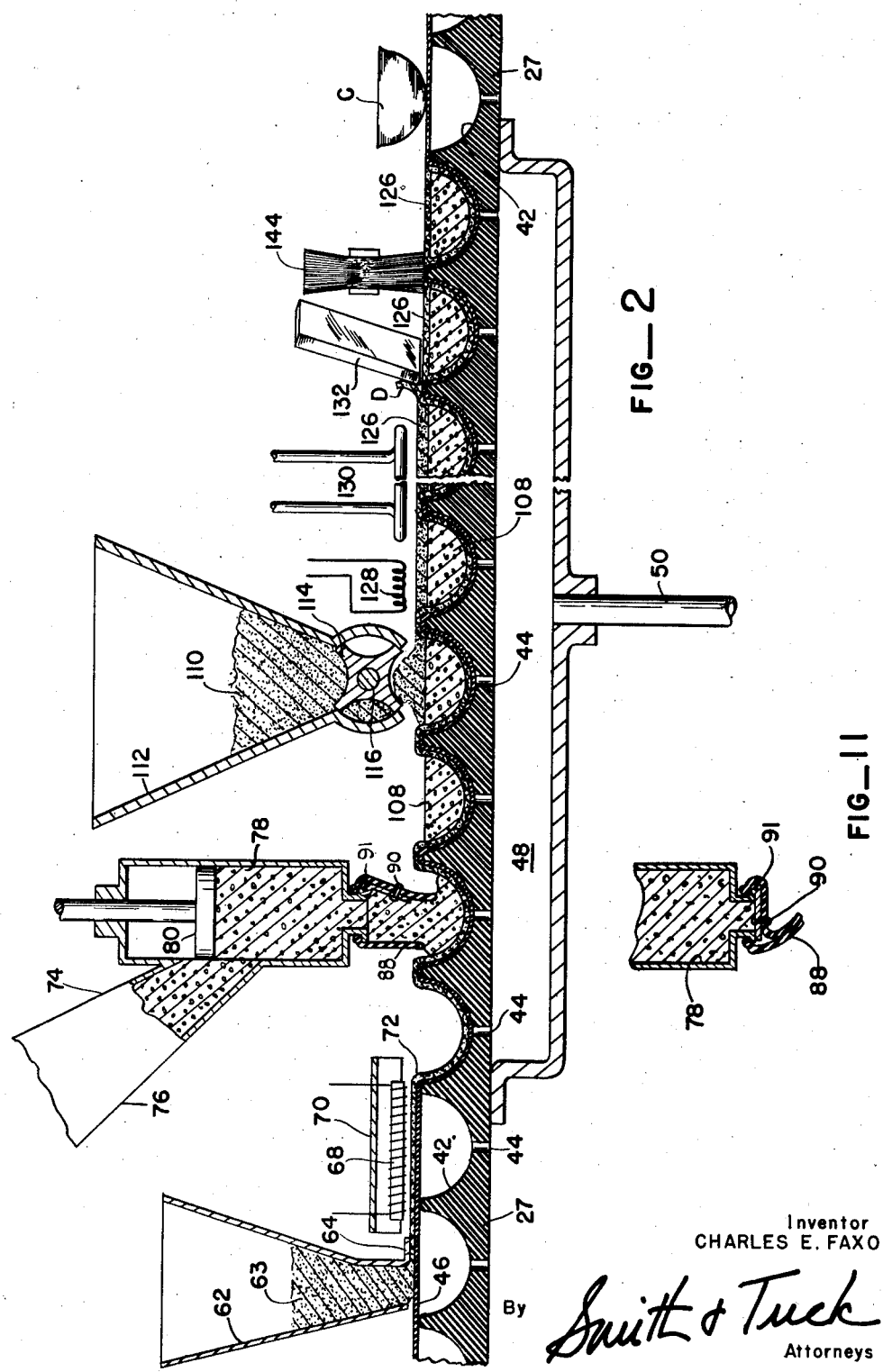

Sept. 7, 1948.  C. E. FAXON  2,448,786
CONFECTIONARY FORMING MECHANISM
Filed June 8, 1946  4 Sheets-Sheet 3
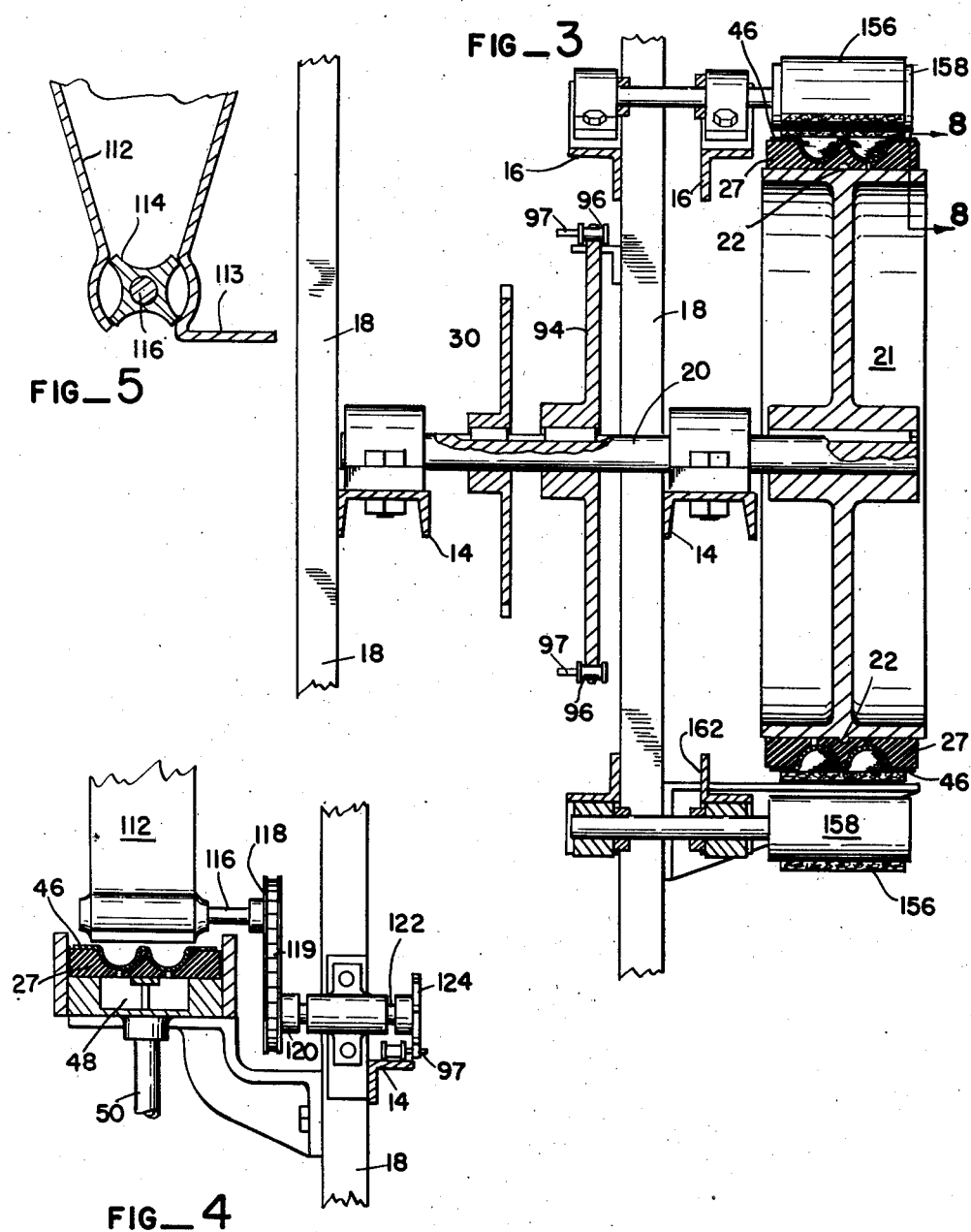
Inventor
CHARLES E. FAXON
By Smith & Tuck
Attorneys

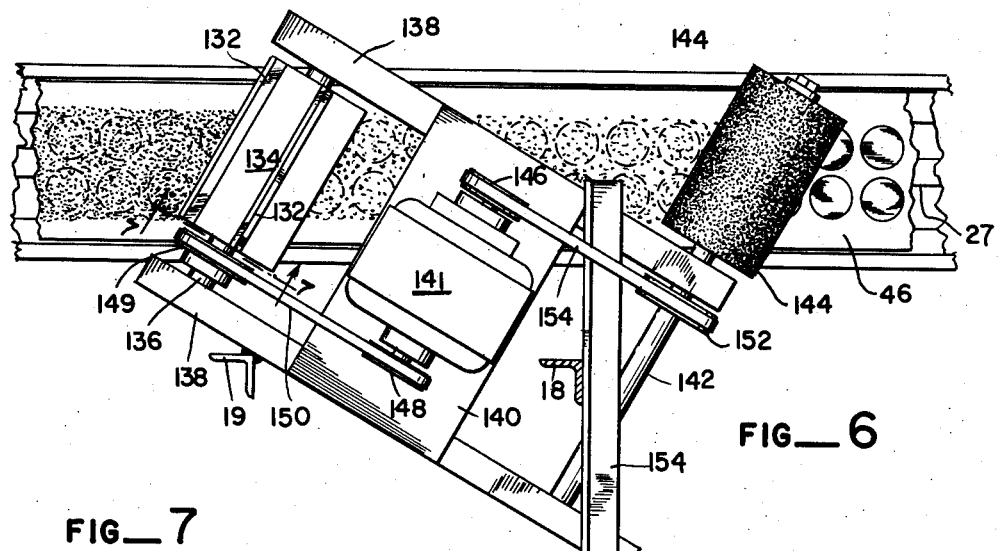
FIG_6
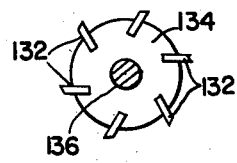
FIG_7
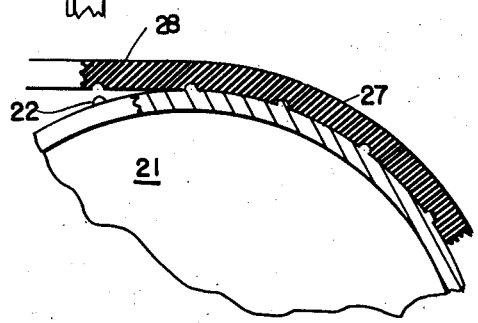
FIG_8
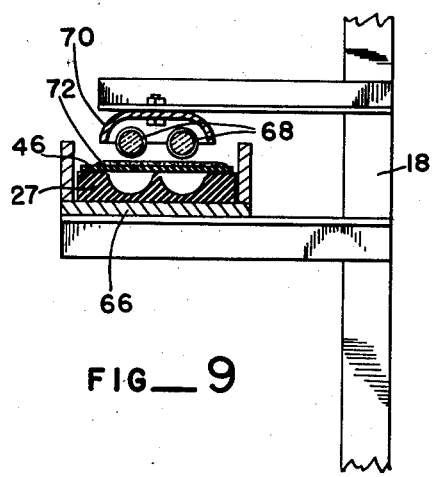
FIG_9

Patented Sept. 7, 1948

2,448,786

UNITED STATES PATENT OFFICE 2,448,786

CONFECTIONERY FORMING MECHANISM

Charles E. Faxon, Republic, Wash.

Application June 8, 1946, Serial No. 675,488

6 Claims. (Cl. 107—8)

This invention relates to the confectionery forming mechanism and, more particularly, is a process and the mechanism for continuously practising that process for producing confections coated and otherwise.

For simplicity of explaining my invention, I confine the description thereof to the production of "chocolates," but it will be apparent to those in the art that the methods and the means shown will be equally useful for other types of confections. I therefore do not intend to limit my invention solely to chocolates, but always have in mind its application more broadly in the art of forming confections.

A chocolate is an object having a center, coated or dipped in the fluid chocolate material. Normally, the centers are hand-formed, although occasionally they are shaped by dropping operations, and they are permitted to set up to a consistency where they may be manually handled. The coating usually consists of ground cocoa-nibs which contains varying proportions of the original fat or cocoa butter and sweetening. The centers for covering with chocolate "couterture" are made of hard and soft materials, such as nougat creams, hard nougat centers, flavored fondant centers, marzipan centers, and liqueur centers. The normal operation today is accompanied by a great amount of manual labor to the end that the finished product is expensive, unless entirely beyond and out of proportion with the cost of the actual materials, the finished product lacks uniformity of shape and size, and in the case of coated centers, lacks uniformity in the thickness of such coatings. Such attempts as have been made to mechanically produce confections have been not too successful because of the complexity of the machinery, the difficulty of producing a confection that avoids "machine-made" characteristics and the relative high cost of such production by comparison with manual operations.

It is an important object of this invention to provide a method that may be practised mechanically to shape the semi-fluid, wet and dry materials employed in confection making, and to assemble them into a confection without resort to manual manipulation.

Another object of the invention resides in providing such a method which is simple to establish mechanically and is efficient in operation in the production of large quantities of confections in a continuous manner.

A further object of the invention is the provision of a mechanism for practising my method, and which overcomes many of the disadvantages of the prior art, and will conserve power, labor, and materials.

Still another object of this invention resides in providing an improved confection assembling mechanism which will have a maximum useful life at a minimum cost, together with maximum efficiency, and will obviate the necessity of employing highly skilled labor for confection production.

The foregoing objects and others ancillary thereto I prefer to accomplish as follows:

According to a preferred embodiment of my invention, considering the process phase of the matter, I employ a resilient membrane upon which I obtain a thin, flexible film of coating material, and which membrane is cupped without separating the film therefrom to form a depression to receive a confection center. While the process may be terminated upon the removal of the confection that is formed at this stage merely by uncupping the membrane, it is preferable that the center be covered with a relatively flat layer of coating material so that it is completely encased. To this additional step may be also added the step of removing both coating and covering material from the membrane from around the cup by either cutting or brushing operations or combinations of both of them. Normally, the cupping of the membrane, which acts as a carrier in a continuous operation of the process, is obtained by applying thereto a negative pressure on that side away from and which would normally be below the one upon which is obtained the thin layer of coating material. Such method steps are practised in a mechanism comprising a frame supporting at least a pair of wheels spaced apart from each other, one of which is driven and around which is mounted an endless flexible belt, the flexibility of which permits curving of the belt as it passes around the wheels and to return to a flat plane where the belt leaves the wheels tangentially thereto. Specifically, this belt is formed of rubber or rubber-like material with, preferably, a plurality of series of semi-rigid depressions ported in their bottoms. Such cupped belt is covered by an endless membranous belt of thin rubber. Drive means is employed to cause the belts to travel endlessly throughout the path described by the wheels.

Under an upper flight of the belts is positioned a vacuum chamber connected with a vacuum pump for reducing the pressure within the chamber and, in turn, within the cups of the cupped belt through the bottom ports. Reduction of pressure thus obtained in the cups, due to the action of external atmospheric pressure on the exposed face of the membrane causes the latter to be deformed downward and flexed to the contour of the cups. Previous to flexure of the membrane and while it is in a flat plane cocoa-nibs, ground to substantial fineness and blended with flavoring and sweetening materials, is deposited on the membrane in the form of a relatively fine powder and, following deposit and before cupping of the membrane, is subjected to heat to melt the same and form a film on the membrane. As the membrane is cupped so also is the film of coating material. Following cupping, a depression is filled with the semi-fluid or hard confection center by a dropping operation, which may be practised by a reciprocal piston and nozzle arrangement or otherwise. Subsequently, to completely cover the confection in the cup an additional quantity of covering material is deposited upon the confection center in the form of a powder or in a semi-fluid form. If this bottom layer is powdered, fluidity is obtained of the same by further application of heat, whereupon the same becomes homogenized and fuses with the coating material lining the depression around the edges thereof. That coating material which is on the membrane between depressions is removed by cutting or scraping or brushing or a combination of these steps, so that the confections in each cup are separate from those of the other cups.

At a suitable point in the process and positioned in the mechanism, I permit the setting of the confection materials, and this may be facilitated by subjecting the same to chilling either naturally or by employing a cold coil heat transfer mechanism. Time is also an element in the setting of the confection and for this purpose and to permit retention of the confections in cupped depressions of the membrane but without the necessity of employing negative pressure, I contact and fuse with the membrane and those confections in the cups with a follower belt that travels with the main belt and the membrane, preferably through a great portion of its path to a point where the follower belt separates from the path of the other belts and in the absence of a vacuum or otherwise, the membrane reflexes to its normal condition, causing the confection to be extruded and deposited.

Such confections are ready to be marked and can be produced in great quantities with relatively unskilled labor and with but the minimum of attention from such operators. Under certain circumstances such confections are finished and ready for marketing, but if it be desired to decorate or otherwise further process the confections, such is easily accomplished manually or mechanically.

The novel features that I consider characteristic of my invention are set forth with particularity in the appended claims. The invention itself, however, both as to its organization and method of production, together with additional objects and advantages thereof, will best be understood from the following description of a specific series of steps and of a specific embodiment, when read in connection with the accompanying drawings, in which Figure 1 is a view in side elevation of my confection-forming machine;

Figure 2 is a compacted, enlarged diagrammatic view, showing the steps of my method and those practised in my mechanism;

Figure 3 is an enlarged vertical sectional view taken on line 3—3 of Figure 1;

Figure 4 is a fragmentary sectional view taken on line 4—4 of Figure 1;

Figure 5 is a cross-sectional view of the lower feeding end of a coating material hopper;

Figure 6 is an enlarged plan view of a portion of the machine as viewed from the plane of line 6—6 of Figure 1;

Figure 7 is an end view of a cutter used in my machine as viewed on line 7—7 of Figure 6;

Figure 8 is an enlarged fragmentary detail view of the driving wheel for the main belt;

Figure 9 is an enlarged cross-sectional view taken on line 9—9 of Figure 1;

Figure 10 is an enlarged detail view of the servo-motor operating the dropper mechanism; and Figure 11 is a detail view, in section, of the dropping mechanism in the closed position.

Referring to the drawings, and particularly to Figure 1, it will be seen that I employ longitudinal stringers in combination with upright standards to form a frame. The lower or base stringer 12 has juxtaposed with relation thereto an intermediate stringer 14 and an upper stringer 16. A plurality of standards 18, suitably joined to the stringers, tie the frame together and support the weight of the various mechanical elements assembled in the mechanism.

In suitable bearings, to the right in Figure 1 is mounted a cross shaft 20 which supports the drive wheel 21 that has on its outer surface driving lugs 22. At the opposite end of the machine is adjustably journalled shaft 24 which supports the driven wheel 23. Between shafts 20 and 24 is a third shaft 26 about the axis of which rotates idler wheel 25. Wheels 21, 23, 25 are enclosed by the main belt, preferably formed of rubber or the like, which has notches 28 on the under surface for the reception of the lugs 22 to insure a positive movement of the belt when wheel 21 is turned.

Wheel 21 has secured thereto a ratchet wheel 30 whose peripheral teeth coact with pawl 32 which, in turn, transmits rotary motion of crank 34 to ratchet 30 in an intermittent or indexing manner. Gear-reduced motor 36, through the instrumentality of sprockets 38 and 39, enclosed by belt 40, produces rotation of crank 34 and through the ratchet and pawl assembly, of wheel 21 intermittently in a predetermined manner.

Belt 27 has on its upper face a series of cups 42 of a shape and size that determines the shape and size of the finished confection. Cups 42 have bottom ports 44 so that they may be exhausted of air in a manner later to be described.

Contiguous with the upper face of belt 27 throughout its entire length is belt membrane 46 that is thin and comprises resilient, stretchable rubber. As the belt 27 with the membrane 46 traveling therewith passes over the vacuum chamber 48, air within cups 42 is withdrawn through ports 44 and atmospheric pressure, operating upon the external face of the membrane causes the same to stretch or conform closely to the inner contour of cups 42. Thus is formed a depression in which is shaped and assembled the confection.

A negative pressure is obtained within chamber 48 by the withdrawal of the air therein through outlet conduit 50, which connects with the vacuum pump 52, activated by motor 54 through the instrumentality of the drive belt 56, drive shaft 57, and driven shaft 58. Air leaving the pump 52 is permitted to exhaust through outlet nozzle 60.

As can best be seen in Figures 1 and 2, I provide a hopper 62 for the deposit of powdered or ground coating material 63 upon the membrane 46. The coating material travels through the hopper and falls upon belt 46 and is spread by lip 64 carried on the following or rear side of hopper 62. In order to insure that the belt 27 and membrane 46 travel in a true plane, I mount the same upon base plate 66 which terminates adjacent the vacuum chamber 48.

Bearing in mind that the membrane 46 moves in an intermittent manner and relatively slowly, it will be observed that when the coating material 63 arrives at a point, to the right of the hopper 62 in Figures 1 and 2, it lies thin and even over the belt surface and may then be subjected to heat from radiant heater element 68 under hood or casing 70. Such irradiation causes the coating material to melt and to fuse together to form a thin semi-fluid film 72 upon the membrane while it is still in a substantially horizontal plane.

Immediately thereafter, or at least while the film 72 is still fluid, the membrane and the cup over which it is disposed arrives over the vacuum chamber and, in the manner previously described, the membrane is sucked down into the cup 42. It carries the fused film 72 downward with the result being the formation of a depression lined with coating or covering material, such as chocolate, ready to receive a confection center or other filling material.

In the case of plastic or semi-fluid centers, the same are formed and delivered to the coated or lined depressions by means of a dropper mechanism, designated as a whole by numeral 74 and comprising hopper 76 having communication with chamber 78 under reciprocal piston 80. Motion of the piston 80 is obtained through suction applied to the under side of a second piston 82 in the chamber of servo-motor casing 83. The two pistons 80 and 82 are coupled together by rod 81 which is urged upwardly by the spring 84.

On the lower end of chamber 78 is formed the nozzle 86 through which the filling material is forced by the downward travel of the piston 80 into the flexible nozzle 88, which also encloses a flap or plate valve 90 pivoted at 91 to one side of the nozzle.

Mounted for rotation with ratchet wheel 30 and drive wheel 21 is a sprocket 94, around which is mounted the link chain 96, which also encircles a driven sprocket 98 on shaft 26. On the edge of chain 96 the pivot pins 97 stand outward as can be seen in Figures 1 and 3. A trip lever 99, actuated by the passage of pins 97, operates three-way valve 100 which controls the vacuum operation of the servo-motor 83. Conduit line 102 connects the valve with the suction line 50 of pump 52 and inlet 104 permits air to return to under piston 82 on its upward stroke.

When the center or filling material deposited from chamber 78 is positioned in one of the cup-like depressions, it assumes a level slightly below the lip of such depression. The numeral 108 designates such a filling or center, and it will be seen in Figure 2 that the coating material as well as the portion of the membrane forming the depression rises peripherally above such filling 108. It is in this space that a bottom layer, formed of granular or powdered material 110, such as chocolate, is deposited from the hopper 112, having a spreading lip 113, as shown in Figure 5, in certain instances. The lower mouth of hopper 112 is adapted to receive a fluted rotor 114 mounted on shaft 116 for the periodic dispensing of a measured quantity of material 110. Turning moment of the rotor 114 is intermittent and timed to coincide with the positioning of one or more of the depressions below hopper 112.

Shaft 116 is attached there to sprocket 118, around which is assembled a sprocket chain 119 that also encircles sprocket 120 on countershaft 122, which, in turn, carries on its outer end a star wheel 124. Indexed or intermittent rotation of shaft 122 is obtained by co-action between pins 97 and the teeth of wheel 124.

As the bottom layer of coating material 110 is deposited in the depressions and they are moved to the right in Figures 1 and 2, the irradiation of heat obtained from electrical element 128 melts the material 110 and fuses it around the edge to the coating material lining the depression. This fusion is facilitated immediately after fluidity is obtained by the operation of the heat absorber coil 130, which facilitates the chilling of the coating materials.

Because of the application of the film 72 over the entire surface of the membrane 46, it will be noted that a certain portion overlies that part of the membrane which spans the space between the various adjacent cups or depressions. It is necessary, therefore, to separate the confections formed in these cups from each other, and for this purpose I employ a blade-like cutter 132, which may be one of several mounted in a rotary spindle 134 on shaft 136. The passage of such a blade 132 through the chocolate between the cups cuts off at least a major portion down substantially to the membrane 46, and the debris D tends to be thrown away laterally of the blade by the fanning motion of the blades 132 as they travel over a circular path, indicated in Figure 6 to be at an angle to the direction of travel of the belt 27. After coating, the surface of the belt is exposed to a rotary brush 144 on shaft 142. This brush sweeps the exposed membrane surface and smoothes the layer 126 of the confection that has been formed. Shafts 136 and 142 are mounted in parallel on longitudinal frame members 138, which are joined together by the tie belt 140 upon which is mounted the motor 141 having pulleys 146 and 148 on opposite ends. Between pulley or sheave 148 and sheave 149 on shaft 136 is the drive belt 150 for the rotary cutter 134. Between sheave 146 and sheave 152 of the shaft 142 is a drive belt 154 whereby rotary power is transmitted to the brush 144.

The frame comprising the members 138 and tie belt 140 is supported above the belts by means of a transverse arm 154 tied to one of the stringers 18 and supplemental stringer 19.

In order to eliminate the necessity of maintaining a suction on the membrane as it leaves the brush and during a subsequent setting up period, I contact the face of the membrane and the confections therein by an endless follower belt 156 which is guided in its travel by the rollers 158 mounted on frame members 160, 161 and 162, as shown in Figure 1. The belt 156 closely contacts and conforms to the outer surface of membrane 46 and all the confections and the major portion of it travels with the membrane, until they reach the zone of separation 170, at which point their paths diverge and the membrane is permitted to re-flex to extrude the confections from the depressions previously existing. The finished confection C will then be carried by belt 156 for ultimate disposal onto a table or into containers or otherwise, as may be desired.

While I have shown and described particular embodiments of my invention, it will occur to those skilled in the art that various changes and modifications may be made without departing from the invention, and I therefore aim in the appended claims to cover all such changes and modifications as fall within the true spirit and scope of my invention.

Having thus described my invention, I claim:

1. A machine for forming confections, comprising: a frame; supported in said frame for rotation about a horizontal axis, a pair of wheels spaced apart from each other; an endless belt enclosing said wheels, said belt having on its exterior face a series of bottom-vented cup-like depressions; a resilient membrane enclosing said belt; means for causing said belt and membrane to travel about the path defined by said wheels; means forming a vacuum chamber beneath the upper flight of said belt; means for evacuating said chamber; means above said belt and said vacuum chamber for depositing confection material in cups formed in the membrane by the action of negative pressure through the bottom vents of the cups of said belt; and an endless retainer belt operable against the face of said membrane from a position above a portion of said chamber to a point substantially therebeyond to retain in said cups, for setting, confections thus produced.

2. A machine for forming confections, comprising: a frame; supported in said frame for rotation about a horizontal axis, a pair of wheels spaced apart from each other; an endless belt enclosing said wheels, said belt having on its exterior face a series of bottom-vented cup-like depressions; a resilient membrane enclosing said belt; means for causing said belt and membrane to travel about the path defined by said wheels; means forming a vacuum chamber beneath the upper flight of said belt; means for evacuating said chamber; means for depositing on said membrane ahead of said vacuum chamber a plastic confection-coating material; means above said belt and said vacuum chamber for depositing filling material in cups formed in the membrane by the action of negative pressure through the bottom vents of the cups of said belt; and an endless retainer belt operable against the face of said membrane from a position above a portion of said chamber to a point substantially therebeyond to retain in said cups, for setting, confections thus produced.

3. A machine for forming confections, comprising: a frame; supported in said frame for rotation about a horizontal axis, a pair of wheels spaced apart from each other; an endless belt enclosing said wheels, said belt having on its exterior face a series of bottom-vented cup-like depressions; a resilient membrane enclosing said belt; means for causing said belt and membrane to travel about the path defined by said wheels; means forming a vacuum chamber beneath the upper flight of said belt; means for evacuating said chamber; means for depositing on said membrane ahead of said vacuum chamber a plastic confection-coating material; means above said belt and said vacuum chamber for depositing filling material in cups formed in the membrane by the action of negative pressure through the bottom vents of the cups of said belt; means for depositing a layer of confection coating on said filling material; means for trimming said membrane about said cups to remove excess confection-coating thereon; means for removing such trimmings from said membrane; and an endless retainer belt operable against the face of said membrane from a position above a portion of said chamber to a point substantially therebeyond to retain in said cups, for setting, confections thus produced.

4. A machine for forming confections, comprising: means forming a series of bottom-vented cups upwardly directed; a resilient membraneous sheet disposed over said cups; means forming a vacuum chamber below a portion of said cups; means for obtaining movement together of said cup-belt and said membraneous sheet relative said vacuum chamber; means for depositing confection-coating on said membrane at a point ahead of said chamber; means for fusing said deposit to said membraneous belt; means for depositing confection-filling in said cups; means for covering said filling with a confection coating; means for trimming said cup edges of confection-coating; and means for removing such trimmings.

5. A machine for forming confections, comprising: means forming a series of bottom-vented cups upwardly directed; a resilient membraneous sheet disposed over said cups; means forming a vacuum chamber below a portion of said cups; means for obtaining movement together of said cup-belt and said membraneous sheet relative said vacuum chamber; means for depositing confection-coating on said membrane at a point ahead of said chamber; means for fusing said deposit to said membraneous belt; means for depositing confection-filling in said cups; and means for covering said filling with a confection coating.

6. A machine for forming coated confections, comprising: an endless belt having a sequential series of bottom-vented cups formed in the outer face; an endless resilient membraneous belt over said first belt and its cups; means for moving said belts in a closed path; means for reducing through the bottom-vents the air pressure under said membrane and within said cup to draw said membrane belt into said cup; and means for depositing in said cup a confection material to be shaped.

CHARLES E. FAXON.

REFERENCES CITED

The following references are of record in the file of this patent:

UNITED STATES PATENTS

| Number | Name | Date |
|---|---|---|
| 356,450 | Coleman | Jan. 25, 1887 |
| 730,643 | Hance | June 9, 1903 |
| 1,138,929 | Boyd | May 11, 1915 |
| 1,144,794 | Rousseau | June 29, 1915 |
| 1,200,705 | Boyd | Oct. 10, 1916 |
| 1,421,600 | Speck | July 4, 1922 |
| 2,155,445 | Pittenger et al. | Apr. 25, 1939 |
| 2,163,580 | Bianchi | June 27, 1939 |
| 2,267,494 | Dotzer | Dec. 23, 1941 |

FOREIGN PATENTS

| Number | Country | Date |
|---|---|---|
| 211,484 | Switzerland | Sept. 30, 1940 |
| 302,628 | Great Britain | Dec. 17, 1928 |
| 394,489 | Great Britain | June 29, 1933 |
| 461,794 | Germany | June 29, 1928 |
| 643,870 | Germany | Apr. 19, 1937 |